April 7, 1953    L. A. HERMITTE ET AL    2,633,707
COMPOUND PLANT FOR PRODUCING MECHANICAL POWER
AND HEATING WITH GAS AND STEAM TURBINES
Filed Nov. 13, 1947      2 SHEETS—SHEET 1

Inventors
Louis A. Hermitte
Marcel H. L. Sédille

By Watson, Cole, Grindle & Watson
Attorneys

April 7, 1953  L. A. HERMITTE ET AL  2,633,707
COMPOUND PLANT FOR PRODUCING MECHANICAL POWER
AND HEATING WITH GAS AND STEAM TURBINES
Filed Nov. 13, 1947  2 SHEETS—SHEET 2

Inventors
Louis A. Hermitte
Marcel H. L. Sédille

By Watson, Cole, Grindle & Watson
Attorneys

Patented Apr. 7, 1953

2,633,707

UNITED STATES PATENT OFFICE 2,633,707

COMPOUND PLANT FOR PRODUCING MECHANICAL POWER AND HEATING STEAM WITH GAS AND STEAM TURBINES

Louis A. Hermitte and Marcel H. L. Sédille, Paris, France, assignors to Societe Rateau (Societe Anonyme), Paris, France, a company of France, and René Anxionnaz, Paris, France, jointly Application November 13, 1947, Serial No. 785,778
In France December 16, 1946

1 Claim. (Cl. 60—49)

It is a known fact that in compound plants used for producing simultaneously heating steam and mechanical power, the amount of energy recovered for a predetermined amount of heating units is all the greater when the maximum temperature to be used in the corresponding cycle is higher.

From this standpoint gas turbines which are already now capable of operating at temperatures that are higher than steam turbines show obvious advantages.

The present invention that covers arrangements and systems of apparatuses for compound plants including gas and steam turbines is of particular interest when the superheated steam is to be produced at a mean temperature or at a comparatively high temperature and when the heating of the water feeding the steam boiler is provided through steam removed from the steam cycle during the expansion stage.

The following description and accompanying drawings given out by way of example and by no means in a limitative sense, will allow understanding how the different embodiments of the invention may be executed, the features appearing either in the drawing or in the specification forming obviously part of said invention. In said drawings.

Figure 5:
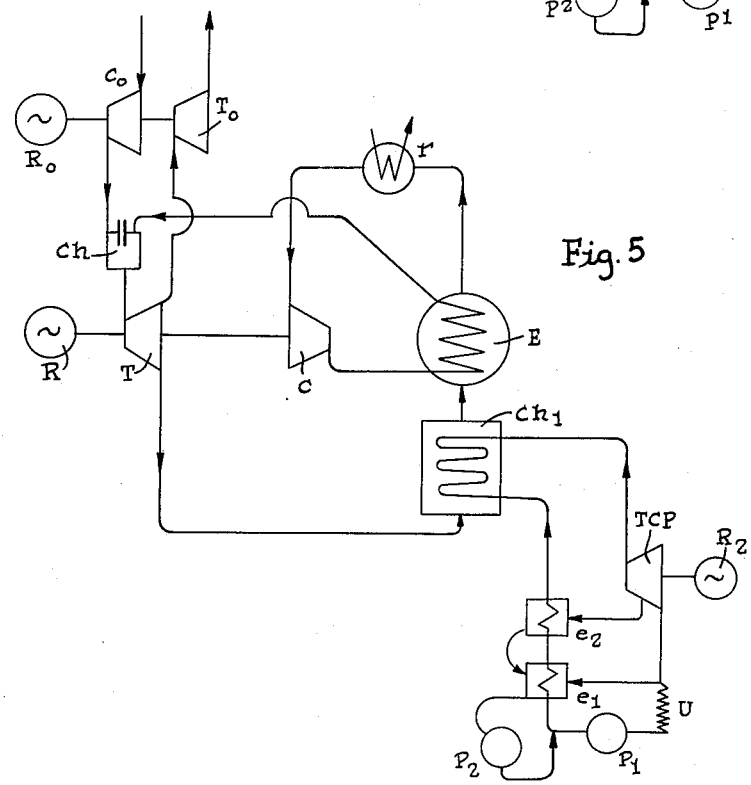

Lastly, Fig. 5 illustrates the application of the invention to a compound plant incorporating a driving unit with gas turbines of the semi-open type.

Figure 1:
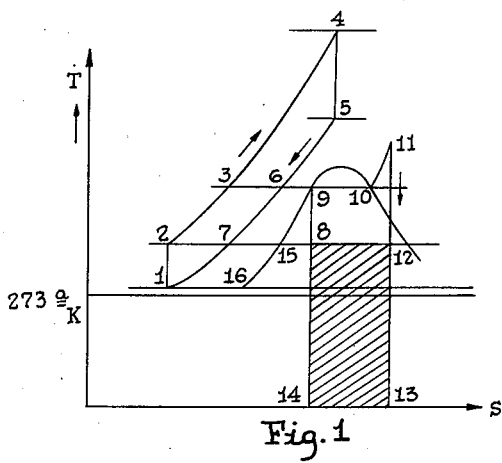
Figs. 1 and 2 illustrate respectively the cycle according to the invention and the corresponding simplest diagram of a compound plant for the production of energy and heating steam.

Fig. 1 is an entropic diagram giving absolute temperatures versus entropy for illustrating the stages affecting the gases and the steam. It is assumed by way of simplification that the expansions and compression are performed adiabatically. The conventional cycle of the gas turbine includes an adiabatic compression 1—2, a heating stage under constant pressure 2—3—4, an adiabatic expansion 4—5 and a cooling stage under constant pressure conditions 5—6—7—1. For the steam turbine, the water is delivered to the feed pump in accordance with line 15—9. It is then vaporized and superheated under constant pressure conditions as shown at 9—10—11 and then expands adiabatically while providing energy at 11—12 and finally abandons its heat to the utilisation circuit at 12—8—15. When the feed water is heated through tappings executed during expansion, the evolution of the steam is equivalent to that shown by the cycle 8—9—10—11—12—8 wherein the condensation is stopped at point 8. Under such conditions, the exhaust gases from the gas turbine that the water in a heat-recovering boiler may theoretically pass out of the latter at the temperature of saturation of the steam at 6. From 6 to 7, the present invention provides for the use of the heat remaining in the exhaust gases in order to heat the air of the gas cycle after compression and before combustion in the first combustion chamber. The use of this remaining heat is all the more considerable when the steam from the auxiliary cycle is produced at a higher temperature and the compressed air is at a lower temperature. It is thus always of interest to cool the air of the gas cycle during compression if the rate of compression reaches a high value. The hatched surface of the diagram illustrates the amount of heat given up by the steam and abandoned thereby for utilisation purposes.

Figure 2:
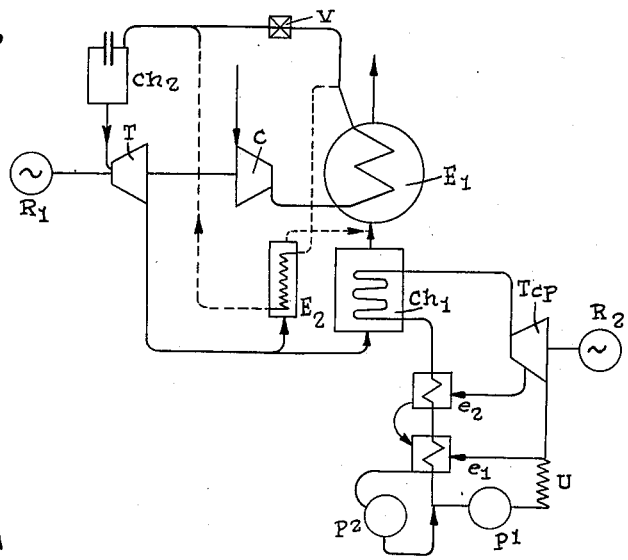

Fig. 2 shows by way of example a form of execution of the compound cycle that has just been described. The engine including a gas turbine is constituted in its simplest form by an air compressor C driven by the gas turbine T that on the other hand produces useful power and, for instance, drives an electric generator R1. The exhaust gases from the gas turbine feed a boiler Ch1 producing the steam of the steam cycle and then a heat exchanger E1 providing a first heating of the air delivered by the compressor C, the subsequent heating of the air for driving the turbine T being performed in the combustion chamber Ch2. The associated steam cycle includes also a counter pressure turbine Tcp driving an electric generator R2. The exhaust from said turbine Tcp feeds the heating circuit U delivering to the outside of the plant the desired heat. The heating of the feed water delivered to the boiler Ch1 by the pump p1 and obtained through the condensation of the heating steam may be performed through the heat exchangers e1—e2 fed by tappings of steam from the expansion side of the turbine Tcp ahead of the heating circuit U. Furthermore it is possible to limit the amount of heat fed to the heating circuit U by providing a second air heating device E2 that uses a fraction of the flow of exhaust gases directly from the turbine T, the air compressed by the compressor C flowing then in succession through the heat exchangers E1—E2 before entering the combustion chamber Ch2 in accordance with the dotted line showing the travel that the air is constrained to follow upon closing of the valve $v$.

Figure 3:
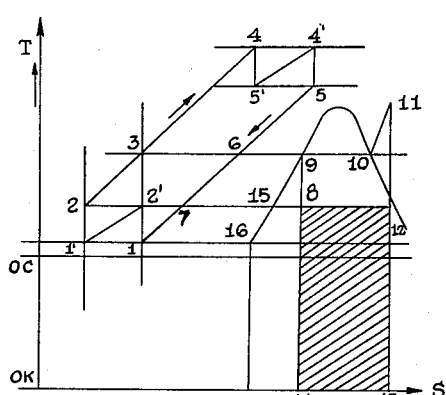
Figs. 3 and 4 illustrate also the cycle and the diagram of a compound plant for producing energy and heating steam with the addition of means of heating during expansion and for cooling during compression inside the driving unit incorporating the gas turbines.
Figure 4:
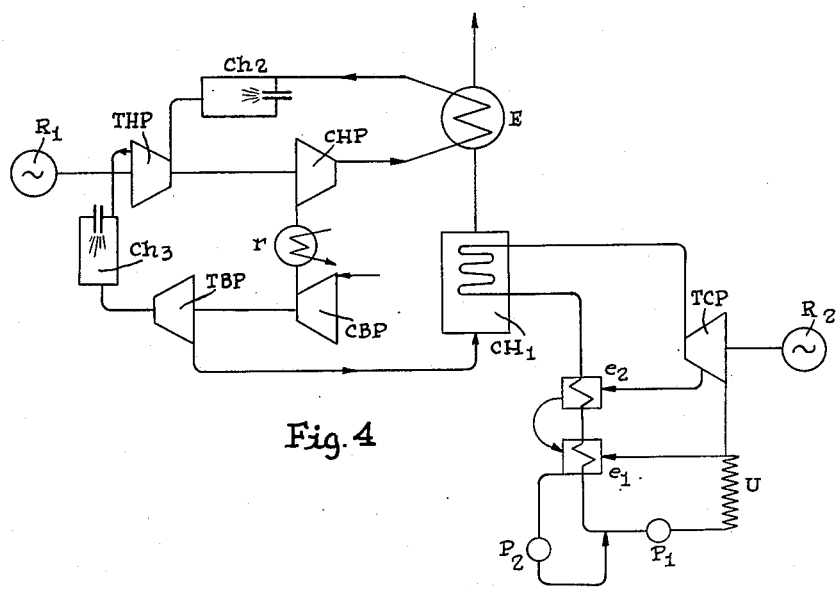

The compound cycle described hereinabove may be still further improved to a substantial extent by cooling on one hand the air during its compression and on the other hand by executing the expansion of the driving gases in several turbine stages separated by intermediary heating means for said gases. The entropic diagram is then transformed into that illustrated in Fig. 3; it differs from that of Fig. 2, by the line 1, 2′, 1′, 2 corresponding to two successive steps of compression 1, 2′ and 1′, 2 with an intermediary cooling from 2′ to 1′ and by the line 4, 5′, 4′, 5 corresponding to two successive steps of expansion 4, 5 and 4′, 5 with an intermediary heating from 5′ to 4′. The apparatuses are grouped in such a case as shown diagrammatically in Fig. 4. It differs from that of Fig. 2 through the incorporation of two gas turbines in series $T_{HP}$ and $T_{BP}$ with an intermediately combustion chamber Ch3 and of two bodies for the air compressor $C_{BP}$ and $C_{HP}$ in series with the interposition of an air cooler $r$.

In the arrangement described above and in other similar arrangements which may be adopted care must be taken to determine the various parts so that the temperature of the gases at the output from the boiler may be higher than the temperature of the air at the end of the compression in the cycle of the gas turbine.

Fig. 5 illustrates such an application corresponding to a compound plant for producing mechanical power and heating steam. The arrangement is very similar to that of Fig. 2 but it includes in addition thereto an auxiliary gas unit To, Co and Ro, the compressor Co of which delivers the required amount of combustive air into the closed circuit of the principal gas group T, C, R and of which the turbine To uses the available expansion between the exhaust of the main turbine and room atmosphere. The boiler for producing steam at Ch1 and the principal heat exchanger E and also an air cooler $r$ are then inserted in the circuit between the turbine and the combustion chamber of the principal group ahead of the suction of the main compressor C.

What we claim is:

In a compound plant for simultaneously producing mechanical power and steam available for heating purposes comprising a fuel burner, an air compressor for delivering compressed air to said burner to support combustion, a gas turbine arranged to receive combustion gas from said burner as a motive fluid, said turbine being coupled with said compressor for driving the same, a steam producer comprising a passage wherein combustion gas from said burner is passed in indirect heat exchange relationship with water to be vaporized, a power steam line connected with said steam producer to be supplied with steam therefrom, said line being separate from said gas turbine, and exhaust operated means for heating air on its way from said compressor to said burner, the combination of first gas conveying means for passing combustion gas from said burner directly to the inlet side of said turbine in a substantially uncooled condition, second gas conveying means for passing exhaust from said gas turbine directly to and through said passage in said steam producer so as to produce steam at high temperature, third gas conveying means for passing said exhaust from said steam producer to said exhaust operated air heating means, means for withdrawing a portion of exhaust from the second-named gas conveying means and leading the same to the third-named gas conveying means in by-pass to said steam producer, and means for withdrawing a portion of air on its way from said exhaust operated air heating means to said burner, passing the same in indirect heat exchange relationship with said portion of exhaust thus by-passed, and mixing it again upstream with respect to said burner with the remainder of air from which it was withdrawn.

LOUIS A. HERMITTE.
MARCEL H. L. SÉDILLE.

REFERENCES CITED

The following references are of record in the file of this patent:

UNITED STATES PATENTS

| Number | Name | Date |
|---|---|---|
| 1,063,622 | Treitel | June 3, 1913 |
| 2,012,963 | Holzwarth | Sept. 3, 1935 |
| 2,012,967 | Meininghaus | Sept. 3, 1935 |
| 2,294,700 | Stroehlen | Sept. 1, 1942 |
| 2,403,388 | Morey et al. | July 2, 1946 |
| 2,428,136 | Barr | Sept. 30, 1947 |